Aug. 13, 1957 K. DAÜNER ET AL 2,802,256
ELECTRIC CONDENSERS
Filed Oct. 20, 1950 2 Sheets-Sheet 1

Inventors,
Karl Dauner, &
Hermann Heywang.
By

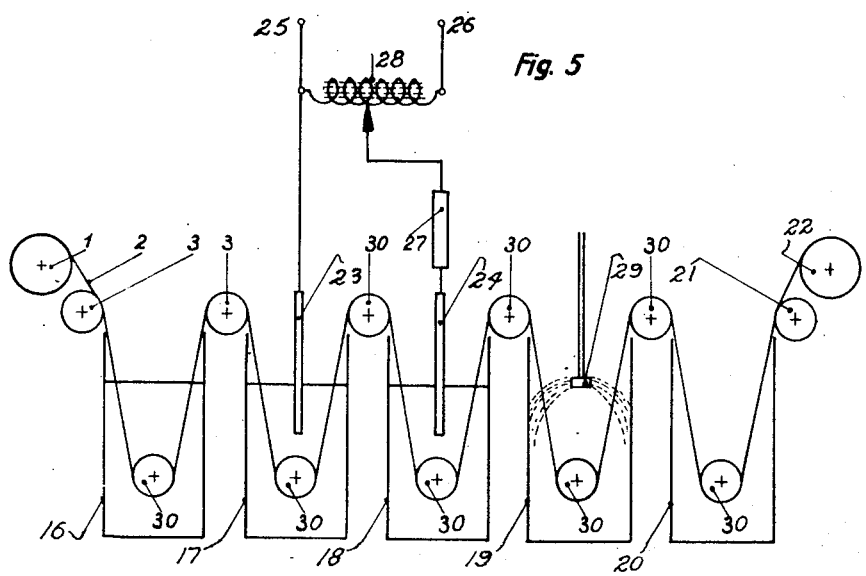

United States Patent Office 2,802,256
Patented Aug. 13, 1957

2,802,256

ELECTRIC CONDENSERS

Karl Dauner, Heldenfingen, near Heidenheim, and Hermann Heywang, Heidenheim-Schnaitheim, Germany, assignors to Siemens & Halske Aktiengesellschaft, Berlin-Siemensstadt and Munich, Germany, a German corporation Application October 20, 1950, Serial No. 213,222
In Germany September 20, 1949

Public Law 619, August 23, 1954
Patent expires September 20, 1969

2 Claims. (Cl. 29—25.42)

This invention relates to electrical capacitors, and is particularly concerned with wrapped capacitors.

A brief review of antecedents is rendered below, to furnish a basis for the understanding of the detailed description of the invention, which is to follow.

Capacitors of the wrapped type are self-healing, that is, capable of regeneration, provided at least one of the metallic coatings is made so thin that it vaporizes or burns upon breakdown, without causing destruction of the capacitor. This action is obtained, for example, in the case of known capacitors by applying by vaporization very thin metallic coatings to paper foils which serve as a dielectric. The contacting of these metallic coatings is easily accomplished simply by staggering them so that only one or the other layer is accessible for contacting at the end faces of the capacitor.

Conditions are much more difficult in the case of the so-called varnish condensers in which the carrier foil is not formed by the dielectric but by one of the metallic coatings. The carrier foil may be a metal foil, for example, aluminum, or it may consist of a metal-coated insulating material. The dielectric is formed in such capacitors by a thin film of varnish which is applied to the metallic carrier foil. The second metallic coating is then formed on the varnish film by vaporization.

It has been proposed to varnish the carrier foils of such capacitors in such a manner that the varnish extends considerably beyond one edge thereof so as to make it possible to contact the two metallic coatings at the end faces of the structures. The formation of such widened marginal insulation is, however, difficult. Experiments made in this direction, with the object of varnishing the carrier foil so as to produce a sufficiently widened margin, have not been successful.

The invention recognizes the fact that it will be very difficult to meet the requirements of varnishing the surface of the carrier foil so to obtain a uniform varnish film and to meet at the same time the requirements which result from the desire to obtain a widened marginal insulation.

It is therefore proposed to separate the two operations by first varnishing the surface of the carrier foil and providing only a slight varnish film at the edge, or omitting the edge entirely and thereafter separately producing the wide varnish margin at the edge.

This principal object of the invention may be realized in several ways, which will now be discussed more in detail.

A relatively simple method of carrying out the invention consists in drawing the carrier foil, which has been varnished on its surface, through a varnish bath, with slight depth of immersion and in a position approximately perpendicular to its edge, so as to widen its edge insulation. This method, however, does not meet all requirements which must be fulfilled by the widened marginal insulation. Varnish adheres to the bottom edge of the carrier foil as it leaves the varnish bath at an angle thereto which, on solidifying, forms the widened varnish margin. Difficulties are encountered in producing in this manner a varnish margin of uniform width and thickness, thus resulting in a structure calling at least for a finishing operation which increases the cost of production.

Another method has been found more suitable in which the film of insulating material, which serves for the widened marginal insulation, consists preferably of varnish corresponding to the varnish applied to the carrier foil, or of another suitable synthetic material which is firmly connected at its narrow edge with the varnish film previously applied to the two sides of the carrier foil. The marginal film is in this case preferably firmly pressed by means of suitable rollers against the varnish film of the carrier foil and, if desired, is continuously molded thereto by the application of heat.

In practicing this method difficulties are, however, encountered in producing a continuous, faultless and firm connection between the marginal film and the varnish film of the carrier foil. The particular disadvantage of this, as well as of the first-mentioned method, consists in the formation of a form of seam between the varnish surface of the carrier foil and the widened insulating margin, which may give rise to distortions and even sudden changes in the electrical characteristic, particularly the dielectric constant and the dielectric strength, and consequently field distortions and/or increased danger of breakdown.

A third method is therefore considered exceptionally important, in which no such seam is formed and the basic thought of which resides in dissolving the carrier foil itself to the required depth, instead of broadening the varnish film applied thereto, and using the remaining undamaged varnish films to form the widened marginal insulation. The dissolving of the foil metal may be accomplished by suitable chemical or electrochemical means which are chosen so as to avoid attacking the varnish. The varnish margins, which then extend outwardly beyond the newly formed edge of the carrier foil and form the desired widened marginal insulation, may be firmly connected or molded together by pressure, application of heat, or by other suitable means, for example by chemical means.

If it is desired to use such carrier foils with widened varnish margin for the production of capacitors, for example, wrapped capacitors, the film of varnish upon the carrier foil must also be provided with a second metallic coating. In order to carry out the contacting of the metallic layers at the end faces of the capacitor, foils are used, in accordance with the invention, having only one edge provided with the widened insulation, as described before, and the thin self-healing metallic coating is preferably applied to both sides of the varnish film in such a manner that it entirely or partially embraces the widened varnish edge, leaving free the nonwidened margin of the carrier foil and spaced therefrom.

When a foil which has been prepared in this manner, comprising a metallic carrier having a film of varnish and a widened varnish edge and carrying a metallic coating upon the surface of the varnish film which has been, for example, vaporized thereon, the metallic coating embracing the widened varnish edge, is rolled or wrapped upon itself to form a capacitor, the two respective metallic coatings will be readily accessible at the two end faces of the structure. It was found, however, that the varnishing of the surface of the metallic carrier member may produce nonuniform insulation of the edge thereof, that is, that the edge is partly insulated and partly noninsulated by the varnish. It is necessary for a satisfactory contacting of this end face of the capacitor that the edge of the metallic carrier member is free of insulation throughout. In order to obtain this condition, the corresponding edge is formed by cutting the varnished carrier member. By making a carrier member for this purpose sufficiently wide and cutting it approximately centrally after its edges have been widened and insulated, as described before, there will result two foils, both of which will be suitable for the formation of the capacitor package after applying to each the thin metallic coating, as explained, since each comprises at one edge a perfect noninsulated edge face of the metallic carrier member and at the other edge an insulated, widened and metallized end face.

The contacting of the end faces of the capacitor, which are formed in this manner, can now be easily effected, as has been tested in practice, for example, by metal spraying, or by tin-plating or, if desired, by the use of sound or ultrasound vibrations. Metallic caplike members are thus formed which cover the end faces of the condenser, holding firmly together and being electrically connected with the metallic coatings thereof in a perfect and satisfactory manner.

Experiments have shown that objections which might be made to the contacting of the edge faces of the extremely thin metallic carrier members are not justified, provided that the contacting, for example, the metallizing, is carried out with sufficient care. The contacting of the other end face of the capacitor is likewise free of difficulties, since the metallic coatings which embrace the widened insulating edge of the carrier member form, at the corresponding end of the capacitor package, a practically uniformly closed continuous metallic surface, and since the gaps formed at the end faces between the individual metallic coatings are so small that metal employed for the contacting cannot penetrate into them, or can enter only to a negligible extent.

In order to protect the dielectric, it is desirable to apply to the end faces of the capacitor package a suitably thin continuous layer of good electrical conductivity which may consist of a solderable metal or an alloy, for example, tin, zinc, lead or alloys of these or similar metals, without introducing any mechanical stresses on the varnish due to trituration of the solder, for example, by spraying, by vaporization in vacuo, electrochemically, or by the use of sound or ultra-sound vibrations. This layer, which is thus electrically perfectly connected with the edges of the metallic coatings forming the end face of the capacitor, must also be well connected electrically with the contact strips which serve as terminals for the metallic coatings. This may be done, for example, by soldering the contact strips to the metallic layer, thereby also desirably reinforcing such layers.

The invention will now be explained with reference to the accompanying drawings showing in diagrammatic representation certain embodiments thereof. In these drawings, Fig. 1 shows a diagrammatic sectional view through a foil made in accordance with the form of the invention in which the metallic foil material is marginally dissolved after forming the varnished carrier foil;

Figs. 4 and 5 show in diagrammatic manner suitable arrangements of means for carrying out the process of the invention.

Figure 1:
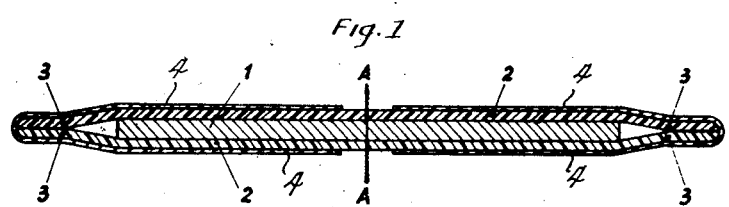

The view shown in Fig. 1 represents a section through a foil prepared in accordance with the invention. The surface of the metallic carrier member 1, which originally occupied the whole foil width, is varnished as indicated at 2. The outwardly projecting varnish margins 3 are formed by marginal dissolution of the metal of the carrier foil 1 at both edges. These projecting varnish margins 3 need not be molded together. However, in order to avoid ingress of moisture into the interior so as to prevent detachment of the varnish film from the carrier member, it is desirable to connect the projecting varnish margins 3 in firm engagement or to mold them together by pressure and/or application of heat, or by suitable chemical means.

Metallic coatings 4 are applied to the varnish films 2 of the carrier member in suitable manner, for example, by vaporization. A central portion is left free and the remainder of the metallic coatings 4 extends over and embraces the edges of the varnish film, as shown. The foil is then cut in longitudinal direction, perpendicular to the plane of Fig. 1, midway of the central non-metallized area along the plane A—A, to produce two separate foils which are suitable for forming a capacitor in which the edges of the two metallic coatings are easily accessible for contacting. It is of course possible to cut the foil of Fig. 1 after it has been rolled to form a package.

Figure 2:
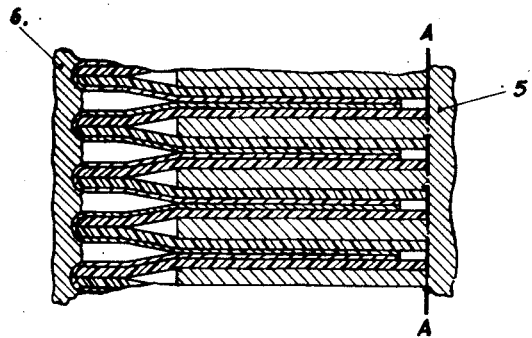
Fig. 2 illustrates in similar diagrammatic manner a fractional sectional view of a capacitor package produced by the use of the foil shown in Fig. 1.

Fig. 2 illustrates a section through a capacitor made with foils produced in accordance with the showing of Fig. 1. The edge A—A corresponds to the cutting edge A—A of Fig. 1. At this end face of the package are positioned the exposed edges of the metallic carrier members which are thus accessible for contacting. A unitary solid metal cap 5 is formed in suitable manner, for example, by spraying, which insures a reliable contact with the exposed edges of the carrier members. At the opposite end face of the package are disposed the metallic coatings which have been vaporized upon the varnish films 2 (Fig. 1), and these coatings are thus easily accessible since they embrace the widened varnish margins. A unitary solid metal cap 6 is similarly formed, for example, by spraying or plating or the like, which is thus connected in a perfectly satisfactory manner, mechanically as well as electrically, with the second metallic coatings 4. Terminal conductors may be suitably secured to the metal caps 5 and 6, for example, by soldering.

It is not always necessary to cut the carrier foil centrally after forming the widened varnish margins, as discussed with reference to Fig. 1. The foil may in many cases be used to form a capacitor directly in a manner which will be apparent from Fig. 3. The metallic carrier member is not used in this case for contacting. Only the metallic coatings on the widened margins are employed for this purpose. The structure forms an interior series arrangement of two component capacitances, one of which is formed by the metallic carrier member and the metallized coating extending from the center to the left in Fig. 3, while the other is formed by the carrier member and the metallized coating extending to the right. Assuming a given thickness of the varnish film, such capacitor will be suitable for higher voltages; or, with a given voltage, the thickness of the varnish film may in such case be reduced approximately by one-half. The contacting is again effected by suitable coating or plating of the metallized widened varnish margins to form terminal caps, as shown in Figs. 3 at 7 and 8.

Figure 3:
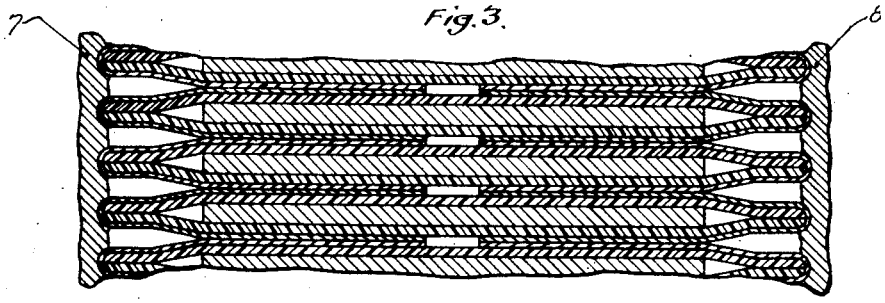
Fig. 3 is a similar diagrammatic sectional view through a modified capacitor package.

It will be apparent that the contacting is obtained in perfect manner in both structures, Figs. 2 and 3, and that the regenerative ability of the condenser is maintained in either case.

Figure 4:
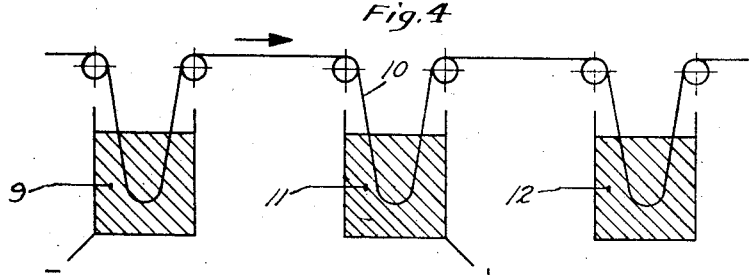

A particularly suitable arrangement for dissolving the metal of the carrier foil so as to form the widened insulating margin edgewise of the foil is shown in Fig. 4. It is of course possible to effect this marginal dissolution of the foil metal, for example, by purely chemical means simply by immersing the end face of the packing in a solution which corrosively dissolves the metal of the foil marginally thereof. However, such expedient has various drawbacks. The corrosive solution enters between the individual layers of the package, and its subsequent removal is either impossible or can be accomplished only with difficulty.

The invention contemplates electrochemically acting corrosive etching in successive stages to accomplish the corrosive dissolution of the marginal portions of the metal of the carrier foil, because a purely chemical action does not always reliably produce a corrosive dissolution of the margin at a sufficient and uniform depth. The manner of arranging the current supply causes difficulties, and it is therefore proposed to carry out the corrosive etching in a plurality of baths through which the foil strip which is to be treated is moved in the direction of the arrow shown in Fig. 4. The first bath, marked by numeral "9," serves merely as a current supply bath, while the etching-out of the metal carrier from the foil 10 is accomplished in the bath marked "11." Accordingly, by employing direct current, the negative pole of the current source is connected to the first bath "9" and the positive pole is connected to the second bath "11." The bath "12" serves as a washing bath and removes residual metallic particles which may have remained between the projecting varnish margins (3 in Fig. 1) of the foil. After leaving the bath "12" the foil strip is dried.

The marginal portion 3 of the varnish films are then united and the metallic layers 4 (Fig. 1) are applied as already discussed.

It is of advantage both in the chemical and also in the electrochemical corrosive etching procedure if the edges of the metallic carrier members, which are to be dissolved, are free of varnish. The corrosive etching solution will then be able to attack them uniformly. This is achieved in a simple manner by cutting the foil strip in desired width from a previously prepared varnished sheet. Such procedure makes it possible to varnish sheets which are several times wider than the foil strips required for the capacitors, thus simplifying production.

While the above-noted procedure is adapted to furnish satisfactory results, extensive experiments have shown that a particularly satisfactory uniformly wide varnish margin may be produced by a combination of chemical and electrochemical corrosive etching of the metallic foil member. Superior results were obtained by treating the foil first chemically and thereafter electrochemically, preferably with alternating current. In a preferred arrangement of the corrosive etching procedure, as illustrated in Fig. 5, the foil to be etched travels first through a chemical bath containing, for example, an acid of suitable concentration, and thereafter, if desired, through a washing bath in which residual acid is removed, dissolved or otherwise rendered harmless. The treatment is then continued in two successive baths, the electrolytic solutions of which are respectively connected with the poles of an alternating current source, for example, by connecting the poles of the current source with the conductive walls of the corresponding bath or with electrodes which are immersed in the electrolytic solutions of the respective baths. The metallic member of the foil which passes successively through these two baths is thus edgewise corrosively etched by alternating current to a uniform depth, leaving widened marginal varnish portions of uniform width. The foil then travels through another washing bath in which electrolytic solution adhering thereto is removed and is then dried and ready for further processing.

It is of course within the scope of the invention to change the number of baths in the individual treatment stages, for example, by employing two chemical baths and only one electrochemical bath.

The washing bath between the chemical and electrochemical corrosive etching may be eliminated by employing similar solutions, for example, hydrochloric acid solutions of desired concentration in the chemical as well as in the electrochemical bath.

The above described process may be practiced by the use of the arrangement diagrammatically shown in Fig. 5. Numeral 13 in this figure indicates a supply drum from which the foil 14 to be treated passes over a tensioning roller 15 and then successively through the chemical bath 16, the two electrochemical baths 17 and 18, then through the washing bath 19 and thereafter through the drier 20. The finished and dried foil having the widened marginal varnish edges passes finally over the tensioning roller 21 to the storage drum 22. Intermediate idler rollers 30 are provided as shown to move the varnished foil through the baths so that the edges thereof are at any two opposite points along such edges always equally spaced from the surface of the liquid. The conditions are similar to Fig. 4.

The baths 16, 17 and 18 contain suitable acid solutions, for example, hydrochloric acid solutions, of suitable and desired concentration so that the previously mentioned washing bath between the stages 16 and 17 can be dispensed with.

Electrodes 23 and 24 extend into the solutions of the baths 17 and 18, respectively. These electrodes are connected to the terminals 25 and 26 of an alternating current source over the resistor 27 and the transformer 28.

Suitable washing means, diagrammatically shown in the form of a spray head 29, may be provided in the washing bath 19. Care must be taken of course to obtain complete and satisfactory washing of both sides of the foil.

The drying at 20 is accomplished in any desired and suitable manner, for example, by the use of suitable heating means.

Changes may be made within the scope and spirit of the following claims.

We claim:

1. A process of making wrapped electrical capacitors comprising the following steps, namely, taking a metallic carrier member, forming on the surface of each side of said carrier member an insulating film, thereafter moving said carrier member with said insulating films thereon through a liquid with the edges of said carrier member at any two opposite points along said edges always equally spaced from the surface of said liquid, said liquid being adapted to dissolve said metallic carrier member so as to remove portions of said member simultaneously along both edges thereof for the purpose of disposing said edges marginally within said insulating films and at uniform depth with respect to the corresponding edges of said insulating films, said insulating films forming marginal insulating portions extending beyond the corresponding edges of said metallic carrier member, firmly uniting said marginally laterally extending portions of said insulating films, applying a metallic coating to the surfaces of said united insulating films leaving a gap approximately midway of said carrier member along which the insulating films thereon are exposed, wrapping the resulting foil about itself to form a package, and applying to each end face of said package terminal means which is respectively intimately connected with said metallic coatings.

2. A process of making wrapped electrical capacitors comprising the following steps, namely, taking a metallic carrier member, forming on the surface of each side of said carrier member an insulating film, thereafter moving said carrier member with said insulating films thereon through a liquid with the edges of said carrier member at any two opposite points along said edges always equally spaced from the surface of said liquid, said liquid being adapted to dissolve said metallic carrier member so as to remove portions of said member simultaneously along both edges thereof for the purpose of disposing said edges marginally within said insulating films and at uniform depth with respect to the corresponding edges of said insulating films, said insulating films forming marginal insulating portions extending beyond the corresponding edges of said metallic carrier member, firmly uniting said marginally laterally extending portions of said insulating films, applying a metallic coating to the surfaces of said united insulating films leaving a gap approximately midway of said carrier member along which the insulating films thereon are exposed, wrapping the resulting foil about itself to form a package, cutting said package radially along a line intersecting said gap to form two separate packages, each package exposing along one end face thereof edge portions of said metallic coating and at the other end face thereof edge portions of said metallic carrier member, and applying to each end face of each package terminal means which is respectively intimately connected with the corresponding metallic coating and said metallic carrier member.

References Cited in the file of this patent

UNITED STATES PATENTS

| | | |
|---|---|---|
| 1,909,079 | Steerup | May 16, 1933 |
| 2,171,231 | Braunschweig | Aug. 29, 1939 |
| 2,323,020 | Dorn | June 29, 1943 |
| 2,387,759 | Jarvis | Oct. 30, 1945 |
| 2,399,798 | Grouse | May 7, 1946 |
| 2,470,826 | McMahon | May 24, 1949 |
| 2,492,166 | Marco | Dec. 27, 1949 |
| 2,520,173 | Sanders | Aug. 29, 1950 |